United States Patent
Happ et al.

(10) Patent No.: US 7,166,645 B2
(45) Date of Patent: Jan. 23, 2007

(54) PROCESS FOR THE ALKALINE SAPONIFICATION OF CROSSLINKED ACRYLONITRILE BEAD POLYMERS

(75) Inventors: Michael Happ, Dormagen (DE); Dieter Irmscher, Bergisch Gladbach (DE); Wolfgang Podszun, Cologne (DE); Rudiger Seidel, Sandersdorf (DE); Wolfgang Zarges, Cologne (DE)

(73) Assignee: Lanxess Deutschland GmbH, Leverkusen (DE)

( * ) Notice: Subject to any disclaimer, the term of this patent is extended or adjusted under 35 U.S.C. 154(b) by 299 days.

(21) Appl. No.: 10/830,324

(22) Filed: Apr. 21, 2004

(65) Prior Publication Data

US 2005/0090621 A1  Apr. 28, 2005

(30) Foreign Application Priority Data

May 19, 2003 (DE) ............................... 103 22 441

(51) Int. Cl.
*C08F 8/12* (2006.01)
(52) U.S. Cl. .................. 521/31; 525/329.1; 525/329.2; 525/329.3; 525/369
(58) Field of Classification Search .................. 521/31; 525/329.1, 329.2, 329.3, 369
See application file for complete search history.

(56) References Cited

U.S. PATENT DOCUMENTS

| | | | | |
|---|---|---|---|---|
| 2,812,317 A | * | 11/1957 | Barrett | 525/369 |
| 3,200,102 A | * | 8/1965 | Kleiner | 525/383 |
| 3,544,488 A | * | 12/1970 | Heller et al. | 521/31 |
| 4,558,100 A | * | 12/1985 | Kightlinger et al. | 525/329.1 |

FOREIGN PATENT DOCUMENTS

| | | |
|---|---|---|
| DE | 101 03 028 A | 8/2001 |
| EP | 067362 | * 12/1982 |
| EP | A 0 406 648 | 1/1991 |
| EP | A 1 110 608 | 6/2001 |

OTHER PUBLICATIONS

A. Litmanovich, et al., "Alkaline Hydrolysis of Polyacrylonitrile. On the Reaction Mechanism", Macromol., Chem. Phys., 2000, vol. 201, p. 2176-2180.

* cited by examiner

*Primary Examiner*—Bernard Lipman
(74) *Attorney, Agent, or Firm*—Norris McLaughlin & Marcus PA

(57) ABSTRACT

The alkaline saponification of acrylonitrile bead polymers provides weakly acidic cation exchangers with little intrinsic color and with reduced residual nitrogen content if the saponification is begun at a temperature T1 of from 70 to 120° C. and, once a degree of saponification of at least 65% has been reached, is completed at a temperature T2 of from 120 to 180° C.

5 Claims, No Drawings

PROCESS FOR THE ALKALINE SAPONIFICATION OF CROSSLINKED ACRYLONITRILE BEAD POLYMERS

The present invention relates to the alkaline saponification of crosslinked acrylonitrile bead polymers, i.e. bead polymers whose preparation is based on acrylonitrile, and also to the use of these saponified acrylonitrile bead polymers as weakly acidic cation exchangers.

The preparation of weakly acidic cation exchangers via hydrolysis of crosslinked acrylonitrile bead polymers is known. This reaction converts the nitrile groups of the polymer into carboxylic acid groups. Acids or solutions of alkalis may be used to induce the hydrolysis process. The acidic hydrolysis reaction involves a sudden and powerful exotherm and is therefore difficult to control under industrial conditions, and is environmentally disadvantageous, because large amounts of waste acid comprising ammonium salt require treatment or disposal. In contrast, the alkaline saponification process has the advantage that the process can easily be steered via the feed of the solution of alkali and/or of the polyacrylonitrile, and that the resultant ammonia can be utilized for a downstream process or another purpose.

EP-A 0 406 648 describes in detail the alkaline saponification of crosslinked acrylonitrile bead polymers. That process provides weakly acidic cation exchangers, using a reaction whose conduct is capable of good control. However, the resultant exchangers have a brownish to yellow color, and comprise a certain proportion of non-hydrolyzed nitrile groups and of non-hydrolyzed amide groups. The nitrogen chemically bonded within the non-hydrolyzed nitrile groups and non-hydrolyzed amide groups is particularly undesirable, because during the use of the resin it can cause ammonia and/or ammonium ions to be emitted into the water to be purified. Use of the resins of EP-A 0 406 648 can result in colored eluate under certain conditions of use, e.g. if severe oxidative and/or thermal stress is present.

EP-A 1 110 608 discloses a process for preparing ion exchangers by polymerizing unsaturated, aliphatic nitriles, using di- or polyvinyl ethers as crosslinking agent, and functionalizing the resultant bead polymers to give ion exchangers. Here again, alkaline saponification is the preferred functionalization method. It provides ion exchanger beads which have a strong yellow color.

During the alkaline saponification of acrylonitrile polymers, an intermediate which has a strong red color is observed at the start of the reaction. It is produced via cyclization of adjacent nitrile groups, forming conjugated systems (Macromol. Chem. Phys. 2000, 201, 2176–2180). As the saponification proceeds, the red color disappears, and weakly acidic cation exchangers having a yellow to brownish color are formed at the temperatures selected in EP-A 0 406 648 and EP-A 1 110 608.

The object of the present invention is the provision of a process for the alkaline saponification of crosslinked bead polymers containing acrylic units, known as acrylonitrile bead polymers, and the use of these saponified acrylonitrile bead polymers as weakly acidic cation exchangers having reduced color and low residual nitrogen content.

Surprisingly, the present object is achieved via a particular temperature profile during the alkaline saponification.

The present invention provides a process for saponifying crosslinked acrylonitrile bead polymers, using an alkaline saponifier, which comprises beginning the saponification at a temperature $T1$ of from 70 to 120° C. and, once a degree of saponification of at least 65% has been reached, completing the saponification at a temperature $T2$ of from 120 to 180° C., $T2$ being higher than $T1$ by at least 10° C.

The saponification at $T1$ may be controlled optically, because it is discernible via a color change of the solution from red to white or colorless. The color change and concomitant conclusion of the first saponification at $T1$ then takes place at degrees of saponification of from 65 to 90%, preferably at degrees of saponification of from 75 to 80%.

According to the invention, $T2$ is higher by at least 10° C. than $T1$, preferably by from 20 to 110° C., particularly preferably by from 30 to 70° C.

In one particular embodiment of the present invention, the acrylonitrile bead polymer has been crosslinked using di- or polyvinyl ether.

The crosslinked acrylonitrile bead polymers intended for saponification are known from the prior art. By way of example, they may be produced via suspension polymerization, using dispersing agents and free-radical initiators. Suitable dispersing agents here are water-soluble cellulose derivatives. A combination of hydroxyethylcellulose with naphthalenesulfonic acid-formaldehyde condensation products has proven particularly successful. Amounts in % by weight or mol % below are always based on the total amount of monomer. The amount of hydroxyethylcellulose used is from 0.05 to 0.5% by weight, preferably from 0.1 to 0.2% by weight, and the amount of naphthalenesulfonic acid-formaldehyde condensation product used is from 0.02 to 0.5% by weight, preferably from 0.03 to 0.1% by weight. It is advantageous during the suspension polymerization to add amounts of from 5 to 40% by weight, preferably from 20 to 30% by weight, of the alkali metal or alkaline earth metal salts of the hydrohalic acids or sulfuric acid, in particular $NaCl$, $Na_2SO_4$, or $CaCl_2$, to the aqueous phase. The salts reduce the solubility of the monomers in the aqueous phase. To reduce agglomerate formation, pH buffers composed of borate or phosphate may be added. Suitable free-radical initiators for the preparation of the acrylonitrile bead polymers are peroxides, hydroperoxides, peresters, azo initiators, and other initiators, where these have half-life times $t_{1/2}=1$ h at from 60 to 140° C. By way of example, mention may be made of peroxy compounds such as dibenzoyl peroxide, dilauroyl peroxide, bis(p-chlorobenzoyl) peroxide, dicyclohexyl peroxydicarbonate, tert-butyl-peroctoate, tert-butyl 2-ethylperoxyhexanoate, 2,5-bis(2-ethylhexanoylperoxy)-2,5-dimethylhexane, or tert-amylperoxy-2-ethylhexane, and also azo compounds such as 2,2'-azobis(isobutyronitrile) or 2,2'-azobis(2-methylisobutyronitrile). Preferred initiators have half-life times $t_{1/2}=1$ h at from 75 to 110° C. Particular preference is given to dibenzoyl peroxide, tert-butyl-2-ethylperoxyhexanoate and 2,2'-azobis(isobutyronitrile), the amounts being from 0.05 to 0.5% by weight, preferably from 0.1 to 0.3% by weight.

For the crosslinking of acrylonitrile bead polymers which are suitable according to the invention, use may be made of known crosslinking agents, such as divinyl benzene, di- and poly(meth)acrylic esters of glycols, glycerol, trimethylolpropane or pentaerythritol, or else 1,7-octadiene, or trivinylcyclohexane. Mixtures of crosslinking agents may, of course, also be used. Preferred crosslinking agents are di- and polyvinyl ethers. Polyvinyl ethers which may be mentioned in the present context are trivinyl ethers of glycerol or trimethylolpropane, or the tetravinyl ethers of pentaerythritol.

Divinyl ethers have the general formula (I)

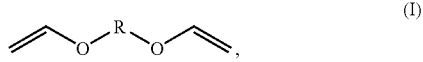
(I)

where
R is a member selected from the group consisting of $C_nH_{2n}$, $(C_mH_{2m}-O)_p-C_mH_{2m}$, and $CH_2-C_6H_4-CH_2$, wherein $n \geq 2$, m=from 2 to 8, and $p \geq 1$.

Preferred divinyl ethers are the divinyl ethers of ethylene glycol, diethylene glycol, triethylene glycol, tetraethylene glycol and butandiol. Butandiol divinyl ether and diethylene glycol divinyl ether are particularly preferred. The amounts used of the crosslinking agents are from 0.2 to 10 mol %, preferably from 0.5 to 5 mol %, particularly preferably from 1 to 2 mol %, based on the entire amount of monomer.

Where appropriate, it is also possible to use other monovinyl compounds during the preparation of acrylonitrile bead polymers to be saponified according to the invention.

Suitable monomers in this context are styrene and styrene derivatives, acrylic and methacrylic acid, or their esters, amides, or anhydrides, vinyl chloride, vinylidene chloride, vinyl acetate, and vinylpyrrolidone. Amounts of these which may be used are from 0.5 to 20 mol %, preferably from 1 to 5 mol %.

In order to increase the porosity of the acrylonitrile bead polymers to be saponified according to the invention, use may be made of porogens. Suitable porogens are organic solvents in which the monomers are soluble but which in relation to the resultant polymer are poor solvents or poor swelling agents. By way of example, mention may be made of compounds of the group consisting of ketones, such as methyl isobutyl ketone, methyl ethyl ketone, or hydrocarbons, such as hexane, octane, isooctane and isododecane, or alcohols, such as butanols, pentanol, hexanol and octanol. Amounts which may be used of these are from 10 to 200% by weight, preferably from 20 to 100% by weight, particularly preferably from 40 to 70% by weight.

The suspension polymerization to prepare the acrylonitrile bead polymers to be saponified according to the invention is preferably executed in 2 stages. The main reaction is first carried out at a temperature of from 50 to 80° C., and is then completed at an elevated temperature. Particular preference is given to polymerization at from 65 to 75° C., followed by increase in the temperature to from 85 to 100° C.

Prior to their conversion, i.e. prior to their saponification to give weakly acidic cation exchangers, the acrylonitrile bead polymers to be saponified according to the invention may, by way of example, be fractionated by sieving.

The alkaline saponifier used comprises aqueous, alcoholic or aqueous-alcoholic solutions of the alkali metal hydroxides and alkaline earth metal hydroxides. It is preferable to use aqueous alkali solutions, such as potassium hydroxide solution, and in particular sodium hydroxide solution. The concentration of the alkali solution to be used is from 10 to 60% by weight, preferably from 35 to 55% by weight.

The selection of the amount of alkali solution is such as to give an alkali excess of from 10 to 500 mol %, preferably from 100 to 300 mol %, based on the amount of the nitrile groups to be saponified.

With a view to reliable and reproducible conduct of the reaction, it is advantageous for the metering of one of the reaction components, the acrylonitrile bead polymer or the alkaline saponifier, over a relatively long period at the temperature T1. This metering time may be from 1 to 10 h, preferably from 2 to 6 h.

In one preferred embodiment of the present invention, the alkaline saponifier is fed into a stirred aqueous suspension of the acrylonitrile bead polymer in a pressure reactor, at the temperature T1. The alkaline saponifier may be metered at a constant rate. However, it has proven particularly advantageous to increase the metering rate during the addition. This method can achieve very uniform reaction and heat generation, with high productivity.

The temperature T1 is from 70 to 120° C., preferably from 80 to 110° C., particularly preferably from 90 to 105° C.

To complete the saponification, the temperature of the reaction mixture is increased to the temperature T2. T2 is from 120 to 180° C., preferably from 130 to 170° C., particularly preferably from 140 to 160° C. The increase in temperature from T1 to T2 does not take place until the red color has faded, and preferably takes place at the end of the metering of alkali. The degree of saponification here prior to the increase in temperature is at least 65%, preferably >75% (measured as residual nitrogen content of the polymer).

T2 is higher than T1 by at least 10° C., preferably by from 20 to 110° C., particularly preferably by from 30 to 70° C.

After the saponification, the acrylonitrile bead polymers take the form of weakly acidic cation exchangers in the salt form, and may, where appropriate, be subjected to ion-exchange and purified.

By way of example, the ion-exchange process, i.e. the conversion of the cation exchanger into the acidic form, takes place at a temperature of from 20 to 100° C., using strong acids. A suitable material is sulfuric acid whose concentration is from 1 to 50% by weight, preferably from 2 to 20% by weight. For purification, the resin may be treated at an elevated temperature with water or steam. Fine-particle constituents may then be removed in a classifying column.

The weakly acidic cation exchangers preferably obtained by the inventive process for alkaline saponification of crosslinked acrylonitrile bead polymers have particularly high capacity, very little intrinsic color and low residual nitrogen content.

The present invention therefore also provides weakly acidic cation exchangers obtainable via saponification of crosslinked acrylonitrile bead polymers, using an alkaline saponifier, where the saponification is begun at a temperature T1 of from 70 to 120° C. and, once a degree of saponification of at least 65% has been achieved, the saponification is completed at a temperature T2 of from 120 to 180° C., and T2 is higher by at least 10° C. than T1.

The inventive weakly acidic, macroporous cation exchangers may be used, inter alia, in the food and drink industry, and for treatment of drinking water. They are particularly suitable for decationization/softening of drinking water, e.g. in household filters, and for decarbonizing drinking water, and also liquids which are used in the form of food or drink or used in the production of food or drink. Other important applications are decationization/softening of sugar solutions and organic-product solutions, e.g. of beet sugar, of cane sugar, and of starch sugar or, respectively, glycerol, gelatin, etc., desalination of water during preparation of ultrahigh-purity water, decarbonization of service water (in the concurrent process), in association with a strongly acid cation exchanger for the desalination of water for industrial steam generation, as a buffer filter downstream of desalination plants for binding alkali metal ions, in the neutralization of regeneration wastewater from desalination plants, in the sodium form for binding heavy metals, such as copper, nickel, or zinc, from solutions at pH>5 in the absence of calcium ions and of complexing agents.

The inventive ion exchangers may in particular be used
- to remove polar compounds from aqueous or organic solutions,
- to remove polar compounds from process streams in the chemical industry,
- to remove heavy metals or precious metals, or arsenic or selenium, from aqueous solutions.

For the purpose of the present invention, heavy metals or precious metals are the elements with the atomic numbers 22–30, 42–50, and 74–83 in The Periodic Table of the Elements.

The inventive ion exchangers and bead polymers may also be used to purify wastewater streams in the chemical industry, and also from waste-incineration plants. Another use of the inventive ion exchangers is the purification of seepage water from landfill sites.

EXAMPLES

Example 1 (Inventive)

1.1. Preparation of an Acrylonitrile Bead Polymer

The polymerization process took place in a 3 liter glass vessel with flat ground flange and with a wide stirrer designed for a vessel with flat ground flange, Pt 100 temperature sensor, reflux condenser, 500 ml dropping funnel, and thermostat with control unit.

| | Aqueous phase |
|---|---|
| 1.184 g | Hydroxyethylcellulose in |
| 126 ml | Deionized water (DI water) |
| 196.8 g | Sodium chloride (technical grade) in |
| 592 ml | DI water |
| 0.414 g | Na salt of naphthalenesulfonic acid-formaldehyde condensate (95% strength) in |
| 77 ml | DI water |
| | Organic phase |
| 760 g | Acrylonitrile |
| 40 g | Diethylene glycol divinyl ether |
| 2.13 g | Dibenzoyl peroxide (75% strength) |

The hydroxyethylcellulose is sprinkled into DI water (deionized water) and stirred for at least 8 h prior to preparation of the aqueous phase. The sodium chloride solution forms an initial charge in the polymerization vessel. The hydroxyethylcellulose solution is added to it. The sulfonic acid solution is stirred for 15 min, and then added to the polymerization vessel. The entire aqueous phase is stirred for a further 30 min.

The organic phase is stirred at room temperature for 15 min, and then is added to the aqueous phase without stirring. The mixture is then allowed to stand for 20 min, without stirring. It is then stirred at room temperature for 20 min at 170 rpm (revolutions per minute).

The mixture is heated to 72° C. within a period of 90 min, with stirring. The onset of the reaction is discernible via a change in the color (cloudy becoming milky-white). The resultant heat of reaction is dissipated by way of the outer jacket of the glass vessel, this jacket having a connection to the thermostat. Peaks in the reaction are intercepted by adding portions of cold water. The total reaction time at 72° C. is 5 h. The mixture is then heated to 90° C. within a period of 1 h, and held for 5 h at this temperature. It is then cooled and transferred to a column, and the resin is purified, using one bed volume of steam. The resin is then rinsed on a 100-mesh sieve, using DI water.

Yield: 1180 ml of resin, dry yield: 93.2%.

N content of polymer: 25.0%

1.2. Alkaline Saponification 500 ml of the resin from example 1.1 are saponified as described below in a 3 liter V4A autoclave, using stirrer and temperature regulation.

| | |
|---|---|
| 500 ml | Resin (moist from suction filtration) |
| 727 ml | DI water |
| 143 ml | NaOH, 45% strength (1st portion) |
| 655 ml | NaOH, 45% strength (2nd portion) |
| 150 ml | DI water |
| 670 ml | DI water |

Resin and water form an initial charge in the autoclave and are heated to 100° C. The 1st portion of the NaOH is pumped in within a period of 120 min. The 2nd portion of the NaOH is then added within a period of 100 min, and 150 ml of water are then rapidly added. During the addition of NaOH, resin specimens are taken, acidified using 6% strength sulfuric acid, washed until neutral, subjected to color determination, dried, and subjected to nitrogen content determination. The mixture is then heated to 150° C. over a period of 1 h, and stirring is continued for 2.5 h. During the pumping-in of the sodium hydroxide solution operations are carried out at atmospheric pressure, and then the pressure is maintained at not more than 4.5 bar. Ammonia produced is depressurized by way of a glass receiver to which water has been added. Once the continued stirring has ended, the mixture is cooled to 100° C., and then depressurized over a period of 40 min. 670 ml of water are pumped in, with the valve open. Finally, the mixture is stirred for a further 1 h at 100° C., with the valve open. After cooling to room temperature, the resin is removed and rinsed on the sieve.

1.3. Assessment of Specimens

| Time (min) | NaOH (ml) | N content (%) | Degree of saponification (%) | Appearance of beads |
|---|---|---|---|---|
| 60 | 71 | 19.5 | 22 | dark red |
| 120 | 143 | 12.8 | 49 | reddish orange |
| 180 | 536 | 8.2 | 67 | pale yellow |
| 220 | 679 | 5.0 | 80 | white |

1.4. Conversion into the H Form

The resin is then charged to a column. The conversion into the H form takes place using 6% strength $H_2SO_4$, until the eluate is markedly acidic. The resin is then washed with water until neutral.

Volume of H form: 1090 ml.

1.5. Properties of Cation Exchanger

Total capacity: 4.80 eq/l

Nitrogen content: 0.22%

Color values of resin: $L^*=80$, $b^*=8$ 310 nm extinction of eluate: 0.04

1.6. Test Methods
Total capacity:
Determined to DIN 54403, method B (weakly acidic cation exchanger).
Nitrogen content: elemental analysis
Color values of resin:
L* (white/black), b* (yellow/blue) and a* (red/green) are the coordinates in the CIE-LAB system. To assess the color of the resin, the color values L* and b* of the CIE-LAB system are used. On the L* axis, 100 means white and 0 means black. Substances with a yellow color have positive b* values. High L* values and low positive b* values are advantageous.

The measurement is made in a Micro Color II color-measurement device from the company Dr. Lange, to DIN 6174 (Colorimetric evaluation of color differences using the CIE-LAB system). To this end, the resin is charged to a cell and covered with water. A white standard is used to calibrate the color-measurement device.
310 nm extinction of eluates:
50 ml of resin are treated with 150 ml of DI water and heated for 16 h at 60° C. in a glass bottle. The extinction of the eluate is measured at 310 nm in a 1 cm quartz cell, using a Specord 200 UV-VIS spectrometer from the company Analytikjena AG.

Example 2 (Comparative Example)

2.1. Preparation of an Acrylonitrile Bead Polymer
Example 1.1 was repeated.

2.2. Alkaline Saponification
500 ml of the resin from example 1.1 are saponified as described below in a 3 liter V4A autoclave, using stirrer and temperature regulation.

| | |
|---|---|
| 500 ml | Resin (moist from suction filtration) |
| 727 ml | DI water |
| 143 ml | NaOH, 45% strength (1st portion) |
| 655 ml | NaOH, 45% strength (2nd portion) |
| 150 ml | DI water |
| 670 ml | DI water |

Resin and water form an initial charge in the autoclave and are heated to 150° C. The 1st portion of the NaOH is pumped in within a period of 120 min. The 2nd portion of the NaOH is then added within a period of 100 min, and 150 ml of water are then rapidly added. Stirring is continued at 150° C. for 3.5 h. During the pumping-in period and the continued-stirring period, the pressure is maintained at not more than 4.5 bar. Ammonia produced is depressurized by way of a glass receiver to which water has been added. Once the continued stirring has ended, the mixture is cooled to 100° C., and then depressurized over a period of 40 min. 670 ml of water are pumped in, with the valve open. Finally, the mixture is stirred for a further 1 h at 100° C., with the valve open. After cooling to room temperature, the resin is removed and rinsed on the sieve.

2.3. Conversion into the H Form
The resin is then transferred to a column. The conversion into the H form takes place using 6% strength $H_2SO_4$, until the eluate is markedly acidic. The resin is then washed with water until neutral.
Volume of H form: 1090 ml.

2.4. Properties of Cation Exchanger
Total capacity: 4.76 eq/l
Nitrogen content: 0.20%
Color values of resin: L*=72, b*=45
310 nm extinction of eluate: 0.22.

It should be understood that the preceding is merely a detailed description of one or more embodiment(s) of this invention and that numerous changes to the disclosed embodiment(s) can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A process for preparing a weakly acidic cation exchanger comprising saponifying crosslinked acrylonitrile bead polymers using an alkaline saponifier, beginning the saponifying at a temperature T1 of from 70 to 120° C. and, once a degree of saponification of at least 65% has been reached, completing the saponifying at a temperature T2 of from 120 to 180° C., T2 being higher than T1 by at least 10° C.

2. The process as claimed in claim 1, wherein the alkaline saponifier is fed at the temperature T1 into an aqueous suspension of the acrylonitrile polymer.

3. The process as claimed in claim 1, wherein the acrylonitrile bead polymer has been crosslinked using a crosslinking agent selected from the group consisting of divinyl ethers and polyvinyl ethers.

4. The process as claimed in claim 3, wherein the crosslinking agent is selected from the group consisting of compounds of the formula (I):

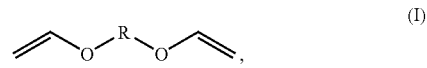

where
R is a member selected from the group consisting of $C_nH_{2n}$, $(C_mH_{2m}-O)_p-C_mH_{2m}$, and $CH_2-C_6H_4-CH_2$, wherein $n \geq 2$, m=from 2 to 8, and $p \geq 1$.

5. The process as claimed in claim 1, wherein the saponifying at the temperature T1 is controlled optically, and a change in the color of the bead polymers from red to white or colorless indicates that the degree of saponification of at least 65% has been reached.

* * * * *

UNITED STATES PATENT AND TRADEMARK OFFICE
CERTIFICATE OF CORRECTION

| | | |
|---|---|---|
| PATENT NO. | : 7,166,645 B2 | Page 1 of 1 |
| APPLICATION NO. | : 10/830324 | |
| DATED | : January 23, 2007 | |
| INVENTOR(S) | : Happ et al. | |

It is certified that error appears in the above-identified patent and that said Letters Patent is hereby corrected as shown below:

Column 3, line 12, "wherein $n \geqq 2$, m=from 2 to 8, and $p \geqq 1$." should read -- wherein $n \geq 2$, m=from 2 to 8, and $p \geq 1$. --

Column 8, line 52, "$CH_2$, wherein $n \geqq 2$, m=from 2 to 8, and $p \geqq 1$." should read -- $CH_2$, wherein $n \geq 2$, m=from 2 to 8, and $p \geq 1$. --

Signed and Sealed this

Twenty-seventh Day of April, 2010

David J. Kappos
*Director of the United States Patent and Trademark Office*